United States Patent
Ojo et al.

(10) Patent No.: US 7,162,099 B2
(45) Date of Patent: Jan. 9, 2007

(54) N-DIMENSIONAL FILTER AND METHOD FOR N-DIMENSIONALLY FILTERING AN ORIGINAL IMAGE PIXEL

(75) Inventors: Olukayode Anthony Ojo, Eindhoven (NL); Tatiana Georgieva Kwaaitaal-Spassova, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 689 days.

(21) Appl. No.: 09/979,228

(22) PCT Filed: Mar. 20, 2001

(86) PCT No.: PCT/EP01/03134

§ 371 (c)(1),
(2), (4) Date: Nov. 19, 2001

(87) PCT Pub. No.: WO01/72032

PCT Pub. Date: Sep. 27, 2001

(65) Prior Publication Data

US 2002/0181798 A1    Dec. 5, 2002

(30) Foreign Application Priority Data

Mar. 24, 2000  (EP) ................. 002010179
Jun. 13, 2000  (EP) ................. 00202058
Feb. 13, 2001  (EP) ................. 01200504

(51) Int. Cl.
*G06K 9/40*     (2006.01)

(52) U.S. Cl. ............. 382/261; 382/263; 382/275
(58) Field of Classification Search ............. 382/254, 382/260–266, 275, 274
See application file for complete search history.

(56) References Cited

U.S. PATENT DOCUMENTS

| 4,072,818 | A | * | 2/1978 | Coviello ................. 382/266 |
| 4,783,840 | A | * | 11/1988 | Song ................. 382/261 |
| 5,715,335 | A | | 2/1998 | De Haan et al. |
| 5,742,355 | A | | 4/1998 | De Haan et al. |
| 6,373,992 | B1 | * | 4/2002 | Nagao ................. 382/266 |

FOREIGN PATENT DOCUMENTS

EP         0682841        11/1995

* cited by examiner

*Primary Examiner*—Samir Ahmed
*Assistant Examiner*—Wes Tucker

(57) ABSTRACT

Known N-dimensional filters 100 and methods for N-dimensionally filtering apply noise reduction to an original image pixel. However, carrying out only noise reduction to a pixel of an image is often not enough when a good picture quality is required. Thus, additionally, sharpness enhancement (peaking) is carried out. However, noise reduction and peaking have contrasting spectral behaviors which lead to non-optimal results when both operations, noise reduction and peaking, are implemented in series. By appropriately defining coefficients $\alpha(p, n)$ or $\beta(p, n)$ of the transmission function, the transmission function is capable of applying both noise reduction and sharpness enhancement to the input signal of the N-dimensional filter 100.

8 Claims, 2 Drawing Sheets

N-DIMENSIONAL FILTER AND METHOD FOR N-DIMENSIONALLY FILTERING AN ORIGINAL IMAGE PIXEL

BACKGROUND OF THE INVENTION

1. Field of the Invention

The invention relates to an N-dimensional filter having a transmission function for applying noise reduction to an original image pixel being provided to the N-dimensional filter by a received input-signal, wherein said transmission function comprises at least one filter-coefficient.

The invention further relates to a method for N-dimensionally filtering an original image pixel p according to a transmission function in order to apply noise reduction to said pixel p.

2. Description of the Related Art

Such N-dimensional filters or filtering methods are known in the art, e.g., from European Patent Application No. EP 0 682 841 B1, corresponding to U.S. Pat. Nos. 5,715,335 and 5,742,355, the contents of which is hereby incorporated by reference. In the European patent application, for every pixel position $p=(x, y, t)^T$, where T indicates transposition, in an input luminance signal $F(p)$, the filter transmission function $F_f(p)$ is defined as follows:

$$F_f(p) = G(p) \cdot \left[ F(p) + \gamma \sum_{n \in N_1} \alpha(p, n) \cdot F(p+n) + \delta \sum_{n \in N_2} \beta(p, n) \cdot F_f(p+n) \right] \quad (1)$$

wherein

N1, N2: are sets of vectors defining one, two or three dimensional neighborhoods of one original image pixel;
n: identifies the position of an actual pixel within said neighborhoods N1, N2;
G(p): is a normalization factor;
$\alpha(p,n)$,: are filter coefficients of said N-dimensional filter, in particular, of said
$\beta(p,n)$ transmission function $F_f(p)$; and
$\gamma$, $\delta$: are predefined constants.

Further, in said European patent application, the filter coefficients are defined as follows:

$$\alpha(p, n) = \begin{cases} w1: & \Delta(p, n) < Th_1 \\ w2: & Th_1 \leq \Delta(p, n) > Th_2 \\ 0: & \Delta(p, n) \geq Th_2 \end{cases} \quad (2)$$

$$\beta(p, n) = \begin{cases} w1: & \Delta_f(p, n) < Th_1 \\ w2: & Th_1 \leq \Delta_f(p, n) > Th_2 \\ 0: & \Delta_f(p, n) \geq Th_2 \end{cases} \quad (3)$$

wherein the parameters $\Delta$ and $\Delta_f$ are defined as follows:

$$\Delta(p,n) = |F(p+n) - F(p)| \quad (4)$$

$$\Delta_f(p,n) = |F_f(p+n) - F(p)| \quad (5)$$

and wherein $Th_1$, $Th_2$: are predetermined threshold values; and
w1, w2: are positive integer values.

FIG. 4 shows an example for a typical distribution of the magnitudes of the filter coefficients $\alpha(p, n)$ or $\beta(p, n)$.

It is important to note that according to European Patent Application No. EP 0 682 841 B1, the filter coefficients $\alpha$ and $\beta$ are defined such that the transmission function carries out only noise reduction to the input signal, i.e., in particular, to the original image pixel. In the case of the transmission function according to formula (1), this is achieved by defining the filter coefficients $\alpha$ and $\beta$ always positive, as is done in formulas (2) and (3).

However, for improving the quality of images, very often noise reduction is not enough. Usually, also sharpness enhancement (peaking) of the image, and in particular, of the image pixels, is additionally required in receivers of an image signal. Traditionally these two operations have been implemented in series. In these cases, the noise filter has, for example, the transmission function (1) while the sharpness enhancement function is realized by another separated filter having quite another transmission function.

However, spectrally, this serial arrangement does not produce an optimal result. This is because noise reduction is commonly a low-pass-filtering operation, while peaking is a high-pass operation. Hence, there is a conflicting spectral demand on both filters and, generally, the optimization of one leads to deterioration of the other. If the noise reduction is done after the peaking, then the noise filter will remove the sharpness enhancement created by a peaking filter. Usually, the peaking is done after the noise filtering as this leads to a more acceptable behavior. However, this also requires some compromise since peaking tends to enhance remaining image noise.

SUMMARY OF THE INVENTION

Starting from the above-noted prior art, it is the object of the invention to provide noise reduction and sharpness enhancement to an original pixel in an easier and cheaper manner.

This object is achieved in a known N-dimensional filter in the way that at least one filter-coefficient of the transmission function is defined such that the N-dimensional filter is capable of applying both noise reduction and sharpness enhancement to the signal input to the N-dimensional filter.

Both operations, noise reduction and sharpness enhancement, are mathematically combined and implemented within the transmission function of said one N-dimensional filter. As a result, when applying the transmission function to the signal, both operations are simultaneously applied to the signal.

Consequently, there is no need for applying a separate sharpness enhancement filter in series with a noise reduction filter. Therefore, the solution can be implemented easily and inexpensively.

Advantageously, when applying the transmission function to the original pixel, each pixel in the neighborhood of the original pixel contributes either to the noise reduction or to the sharpness enhancement of the original pixel, but not to both.

According to a preferred embodiment, the transmission function $F_f(p)$ has the advantage that it is very generic due to its recursive character. It enables the use of already filtered pixels for calculating the transmission function $F_f(p)$ for new pixels.

For enabling the transmission function to carry out both noise reduction and sharpness enhancement, the filter-coefficients $\alpha(p,n)$, $\beta(p,n)$ of said transmission function are preferably defined such that they either have a first or a second sign depending on whether or not a predetermined parameter $\Delta$ or $\Delta_f$ lies between predetermined threshold values $Th_3$ and $Th_4$. The parameters $\Delta$ and $\Delta_f$ preferably represent a difference between the gray value of a neighbor pixel in said predetermined N-dimensional neighborhood of the original pixel and the gray value of original pixel itself. The different signs of the filter coefficients ensure, advantageously, that the operations noise reduction and sharpness enhancement are realized by the same transmission function but are respectively applied to different neighbor pixels of the original pixel. In that mutually exclusive way, the conflicting spectral behavior of both operations is at least partly overcome.

It is advantageous to filter only a selected spectral component of the input signal by said N-dimensional filter. In this case, the rest of the input signal, which is usually a video signal, is passed by said N-dimensional filter without filtering.

The above identified object of the invention is further solved by a method for N-dimensionally filtering an original image pixel. The advantages of said method correspond to the above-described advantages of the N-dimensional filter.

Finally, the above object is solved by a display apparatus incorporating such an N-dimensional filter.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

In the following, a preferred embodiment of the present invention will be described by referring to FIGS. 1 and 2.

The invention concerns, preferably but not exclusively, non-linear spatial, recursive spatial or spatial-temporal filters. Consequently, the invention might, e.g., be based on a non-linear recursive spatio-temporal filter having a transmission function $F_f(p)$ as defined in equation 1. Said transmission function defines the filter output for an original image pixel input to said filter. Depending on whether or not one of the constants $\gamma$ or $\delta$ is zero, the transmission function includes a different number of groups $\alpha$, $\beta$ of filter coefficients. In general, for defining said filter output, said transmission function carries out a mathematical combination of filter-coefficients $\alpha(p, n)$, $\beta(p, n)$ which, respectively, belong to groups $\alpha$ and $\beta$ of filter coefficients, and which are, according to the present invention, defined as follows:

$$\alpha(p, n) = \begin{cases} w1 & : \Delta(p, n) < Th_1 \\ w2 & : Th_1 \leq \Delta(p, n) < Th_2 \\ p & : Th_3 \leq \Delta(p, n) \leq Th_4 \\ 0 & : \text{otherwise} \end{cases} \quad (6)$$

$$\beta(p, n) = \begin{cases} w1: \Delta_f(p, n) < Th_1 \\ w2: Th_1 \leq \Delta_f(p, n) < Th_2 \\ p: Th_3 \leq \Delta_f(p, n) \leq Th_4 \\ 0: \text{otherwise} \end{cases} \quad (7)$$

wherein the variables and parameters p, n, $\Delta_f$, $Th_1$–$Th_4$, w1 and w2 are defined as described above. The threshold values $Th_1$–$Th_4$ are freely selectable.

However, the definition of coefficients $\alpha(p, n)$ and $\beta(p, n)$ differs from their definitions in the prior art for the case that the parameters $\Delta$ or $\Delta_f$ lie, respectively, between $Th_3$ and $Th_4$; i.e., for the case that the difference between the gray value of a neighbor pixel and the gray value of the original pixel lies between the threshold values $Th_3$ and $Th_4$.

Figure 1:
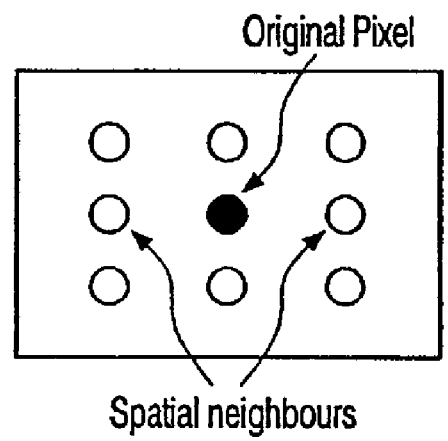
FIG. 1 shows a two-dimensional window for spatial noise filtering according to the present invention.

FIG. 1 shows a typical 2-dimensional arrangement of neighbor pixels surrounding an original, i.e., actually regarded, pixel of an image.

If the parameters $\Delta$ or $\Delta_f$ lie, respectively, between $Th_3$ and $Th_4$, the coefficients $\alpha(p, n)$ and $\beta(p, n)$ have a negative sign and a magnitude of P≠0 which is freely programmable to a predetermined value. In this case, peaking is allowed to be applied to all of those neighbor pixels which do not take part in weighted averaging, i.e., which are not the subject matter of noise reduction. Noise reduction is applied to neighbor pixels the coefficients of which are positive. In this way, filtering and peaking are realized within the same filter in a mutually exclusive way when determining the filter output $F_f(p)$ for the original pixel.

Figure 2:
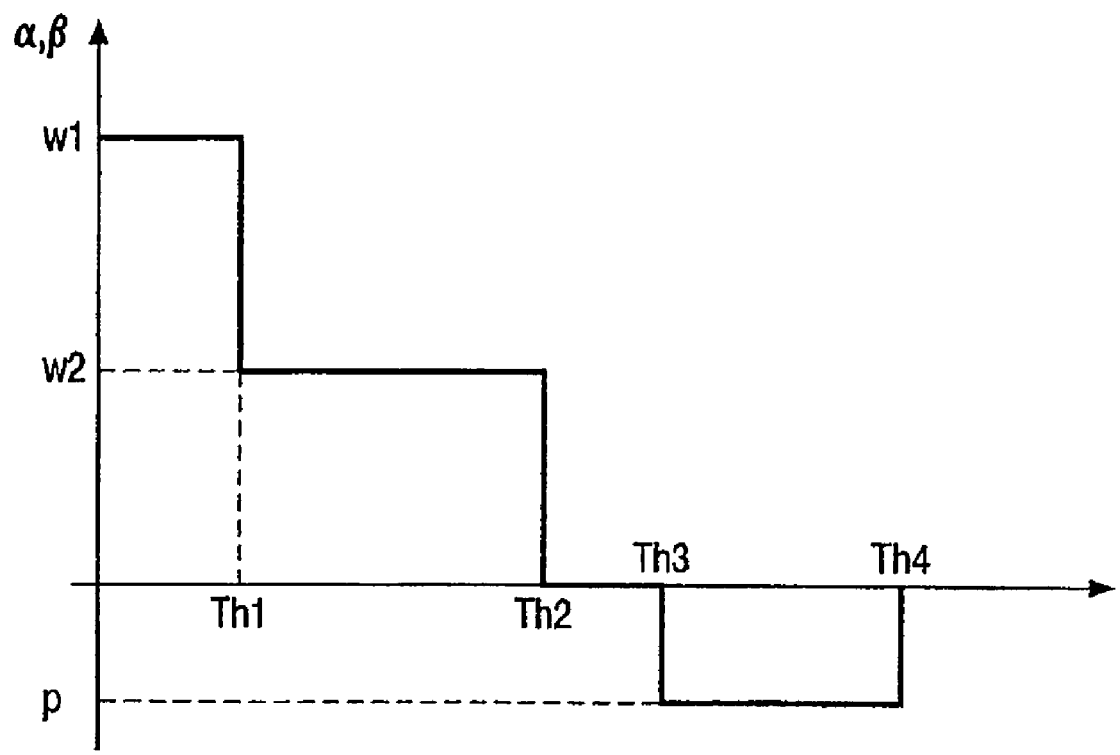
FIG. 2 shows an example for the magnitudes of the filter coefficients $\alpha(p, n)$, $\beta(p, n)$ according to the present invention.

FIG. 2 shows an example for a typical distribution of the filter coefficients according to the present invention. It is important to note that according to the present invention, these filter coefficients may not only be positive, as indicated by w1 and w2, but may also be negative as indicated by P. In this way, the transmission function according to formula (1) is, according to the invention, enabled to apply not only noise reduction but also sharpness enhancement to the original image pixel.

In an experimentally verified embodiment of a transversal spatial filter, good results are achieved using the following neighborhood $N_1$:

$$N_1 = \left\{ \begin{bmatrix} 0 \\ 0 \\ 0 \end{bmatrix} \begin{bmatrix} -2 \\ 0 \\ 0 \end{bmatrix} \begin{bmatrix} -4 \\ 0 \\ 0 \end{bmatrix} \begin{bmatrix} 2 \\ 0 \\ 0 \end{bmatrix} \begin{bmatrix} 4 \\ 0 \\ 0 \end{bmatrix} \begin{bmatrix} -2 \\ -2 \\ 0 \end{bmatrix} \right.$$

$$\left. \begin{bmatrix} 2 \\ -2 \\ 0 \end{bmatrix} \begin{bmatrix} 6 \\ -2 \\ 0 \end{bmatrix} \begin{bmatrix} -6 \\ -2 \\ 0 \end{bmatrix} \begin{bmatrix} 10 \\ -2 \\ 0 \end{bmatrix} \begin{bmatrix} 0 \\ -4 \\ 0 \end{bmatrix} \begin{bmatrix} -4 \\ -4 \\ 0 \end{bmatrix} \begin{bmatrix} 4 \\ -4 \\ 0 \end{bmatrix} \begin{bmatrix} 8 \\ -4 \\ 0 \end{bmatrix} \begin{bmatrix} -8 \\ -4 \\ 0 \end{bmatrix} \begin{bmatrix} -2 \\ 2 \\ 0 \end{bmatrix} \begin{bmatrix} 2 \\ 2 \\ 0 \end{bmatrix} \begin{bmatrix} 6 \\ 2 \\ 0 \end{bmatrix} \begin{bmatrix} -6 \\ 2 \\ 0 \end{bmatrix} \begin{bmatrix} 10 \\ 2 \\ 0 \end{bmatrix} \begin{bmatrix} 0 \\ 4 \\ 0 \end{bmatrix} \begin{bmatrix} -4 \\ 4 \\ 0 \end{bmatrix} \begin{bmatrix} 4 \\ 4 \\ 0 \end{bmatrix} \begin{bmatrix} 8 \\ 4 \\ 0 \end{bmatrix} \begin{bmatrix} -8 \\ 4 \\ 0 \end{bmatrix} \right\}$$

while selecting w1=1, w2=1/4, Th$_2$=4×Th$_1$, Th$_3$=5×Th$_1$, Th$_4$=8×Th$_1$, γ=1, and β=0. Th1 is adapted to the noise level. P is programmable and has a value between −1/16 and 0.

It should be noted that several other configurations, e.g., on block, field or frame basis are possible.

Figure 3:
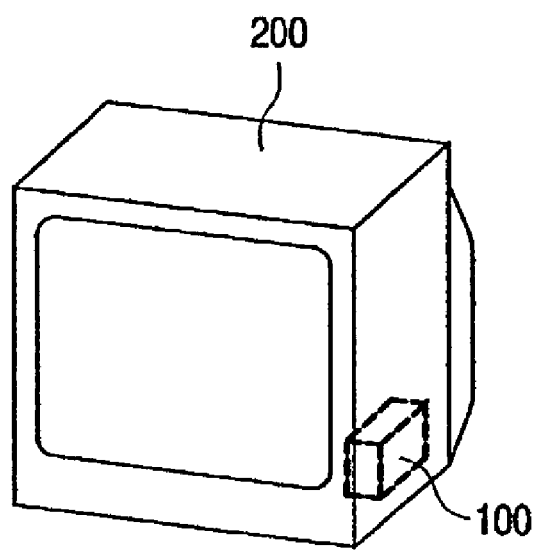
FIG. 3 shows a display apparatus according to the invention.
Figure 4:
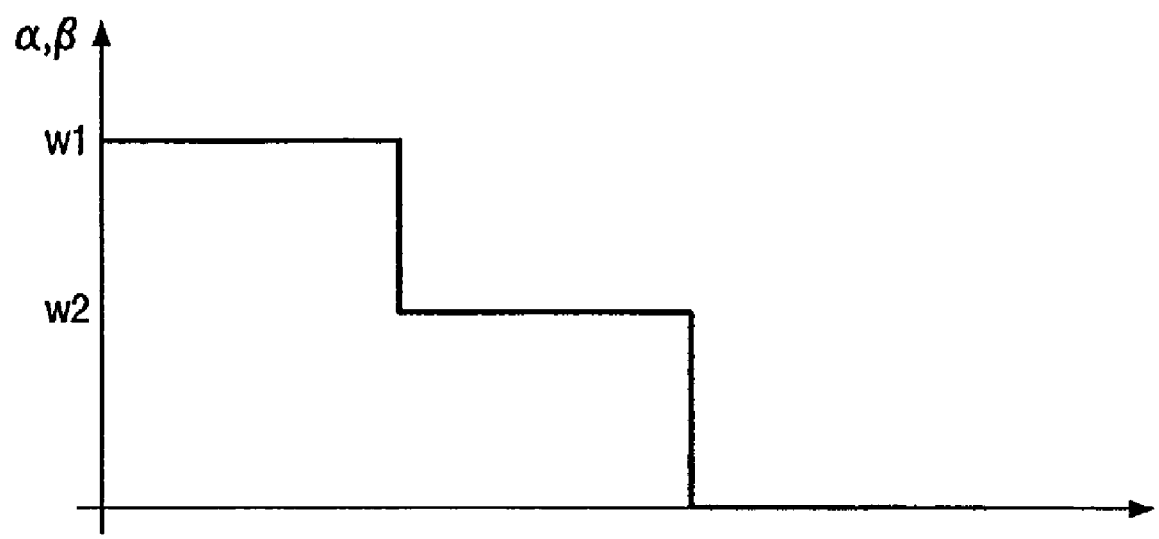
FIG. 4 shows an example for magnitudes of the filter coefficients $\alpha(p, n)$, $\beta(p, n)$ according to the prior art.

FIG. 3 shows a display apparatus 200, e.g., a television set or a computer monitor, for displaying images. Said display apparatus comprising a N-dimensional filter 100 as described above for processing input images before being displayed by said display apparatus.

The invention claimed is:

1. An N-dimensional filter having a transmission function for applying noise reduction to an original image pixel p being provided to the N-dimensional filter by a received input signal, wherein at least one filter coefficient of the transmission function is defined such that the transmission function applies both noise reduction and sharpness enhancement, simultaneously, to the signal input to said N-dimensional filter, and wherein the transmission function is defined as follows:

$$F_f(p) = G(p) \cdot \left[ F(p) + \gamma \sum_{n \in N_1} \alpha(p,n) \cdot F(p+n) + \delta \sum_{n \in N_2} \beta(p,n) \cdot F_f(p+n) \right]$$

wherein p(x,y,t): represents the spatial and temporal position of the original or a neighbor pixel;

N1, N2: are vectors defining a one, two or three dimensional neighborhood of the original pixel;

n represents the position of a current neighbor pixel in a neighborhood N1, N2;

G(p): is a normalization factor;

α, β: are groups of filter coefficients α(p, n) and β(p, n) of the transmission function;

γ, δ: are constants; and

F(p): is an input luminance signal applied to said N-dimensional filter, characterized in that α(p, n) represent the filter-coefficients of a first group a of filter coefficients and being defined as:

$$\alpha(p,n) = \begin{cases} w1: & \Delta(p,n) < Th_1 \\ w2: & Th_1 \le \Delta(p,n) < Th_2 \\ p: & Th_3 \le \Delta(p,n) \le Th_4 \\ 0: & \text{otherwise} \end{cases}$$

and β(p, n) represent the filter-coefficients of a second group β of filter coefficients and being defined as:

$$\beta(p,n) = \begin{cases} w1: & \Delta_f(p,n) < Th_1 \\ w2: & Th_1 \le \Delta_f(p,n) < Th_2 \\ p: & Th_3 \le \Delta_f(p,n) \le Th_4 \\ 0: & \text{otherwise} \end{cases}$$

wherein:

Th$_1$–Th$_4$: are threshold values,

P: is a negative programmable parameter, and w1, w2: are positive programmable parameters; and wherein the parameters Δ and Δ$_f$ are defined as follows:

$$\Delta(p,n) = |F(p+n) - F(p)|$$

$$\Delta_f(p,n) = |F_f(p+n) - F(p)|.$$

2. The N-dimensional filter as claimed in claim 1, characterized in that each filter coefficient of said transmission function is respectively assigned to a different one of neighboring pixels being comprised in a N-dimensional neighborhood of said original pixel and defines if the assigned neighbor pixel contributes either to noise reduction or to sharpness enhancement of the original pixel.

3. The N-dimensional filter as claimed in claim 1, characterized in that the original pixel as well as the neighbor pixels p(x, y, t)$^T$ having the time component t are used either for noise reduction or sharpness enhancement.

4. The N-dimensional filter as claimed in claim 1, characterized in that the input signal is a selected spectral component of a video signal.

5. The N-dimensional filter as claimed in claim 1, characterized in that if the parameters Δ and Δ$_f$ do not lie between Th$_3$ and Th$_4$, the filter coefficients α(p,n) or β(p,n) have a + sign, and if the parameters Δ and Δ$_f$ lie between Th$_3$ and Th$_4$, the filter coefficients α(p,n) or β(p,n) have a − sign.

6. The N-dimensional filter as claimed in claim 1, characterized in that the N-dimensional filter is embodied in an application specific integrated circuit (ASIC).

7. A display apparatus for displaying images, said display apparatus comprising the N-dimensional filter as claimed in claim 1.

8. A method for N-dimensionally filtering an original image pixel with respect to noise reduction according to a transmission function, the method being characterized by the step of;

defining at least one filter-coefficient of the transmission function such that the transmission function applies both noise reduction and sharpness enhancement, simultaneously, to the original image pixel applied to an N-dimensional filter, wherein the transmission function is defined as follows:

$$F_f(p) = G(p) \cdot \left[ F(p) + \gamma \sum_{n \in N_1} \alpha(p,n) \cdot F(p+n) + \delta \sum_{n \in N_2} \beta(p,n) \cdot F_f(p+n) \right]$$

wherein p(x,y,t): represents the spatial and temporal position of the original or a neighbor pixel;

N1, N2; are vectors defining a one, two or three dimensional neighborhood of the original pixel;

n represents the position of a current neighbor pixel in a neighborhood N1, N2;

G(p): is a normalization factor;
α, β: are groups of filter coefficients α(p, n) and β(p, n) of the transmission function;
γ, δ: are constants; and
F(p): is an input luminance signal applied to said N-dimensional filter, characterized in that α(p, n) represent the filter-coefficients of a first group a of filter coefficients and being defined as:

$$\alpha(p, n) = \begin{cases} w1 & : \Delta(p, n) < Th_1 \\ w2 & : Th_1 \leq \Delta(p, n) < Th_2 \\ p & : Th_3 \leq \Delta(p, n) \leq Th_4 \\ 0 & : \text{otherwise} \end{cases}$$

and β(p, n) represent the filter-coefficients of a second group β of filter coefficients and being defined as:

$$\beta(p, n) = \begin{cases} w1 & : \Delta_f(p, n) < Th_1 \\ w2 & : Th_1 \leq \Delta_f(p, n) < Th_2 \\ p & : Th_3 \leq \Delta_f(p, n) \leq Th_4 \\ 0 & : \text{otherwise} \end{cases}$$

wherein:
$Th_1$–$Th_4$: are threshold values,
P: is a negative programmable parameter, and
w1, w2: are positive programmable parameters; and wherein the parameters $\Delta$ and $\Delta_f$ are defined as follows:

$\Delta(p, n) = |F(p+n) - F(p)|$ $\Delta_f(p, n) = |F_f(p+n) - F(p)|$.

* * * * *